Dec. 1, 1931.   C. B. SCHUMACHER   1,834,427
AEROPLANE LANDING GEAR
Filed Aug. 21, 1929
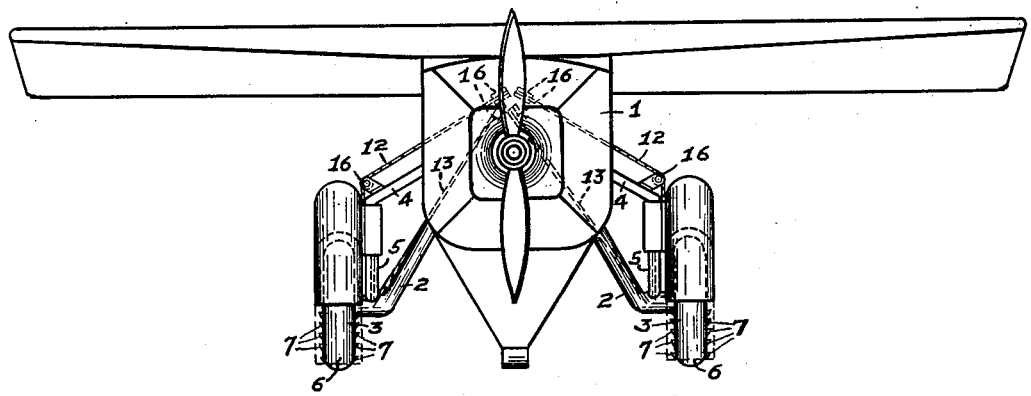
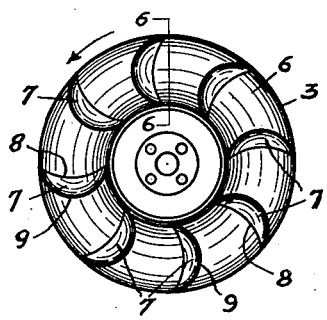
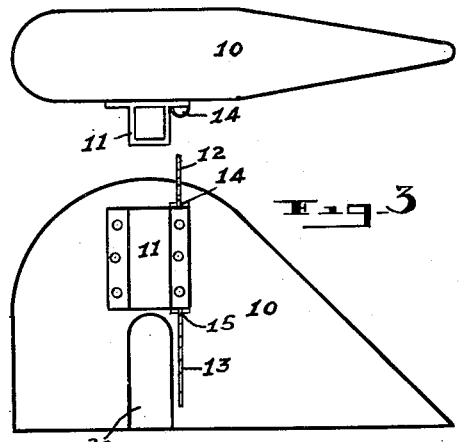
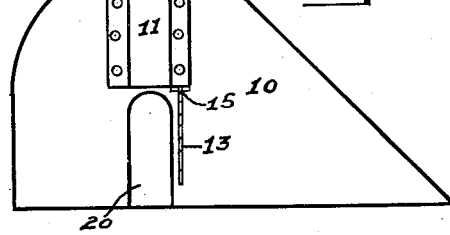
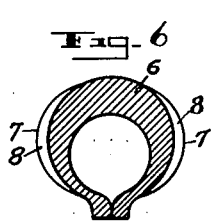
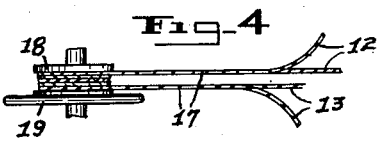
INVENTOR
Charles B. Schumacher
By Jack R Snyder
attorney Patented Dec. 1, 1931

1,834,427

UNITED STATES PATENT OFFICE

CHARLES R. SCHUMACHER, OF PITTSBURGH, PENNSYLVANIA

AEROPLANE LANDING GEAR

Application filed August 21, 1929. Serial No. 387,378.

My invention relates to certain new and useful improvements in landing gears for aeroplanes, and important objects of the invention are to provide a landing-gear of the character described which will facilitate the landing of aeroplanes, which will reduce drag resistance of the aeroplane, and particularly which completely absorbs the impact of the first shock in alighting.

Further objects of the invention are to provide a device of the class stated which is simple in its construction and arrangement, strong, durable and efficient, compact and conveniently operable, which may be readily installed in an aeroplane already constructed as well as form component part of a new structure, and which is comparatively inexpensive to manufacture, install and maintain.

With the foregoing and other objects in view which will appear as the description proceeds, the invention resides in the combination and arrangement of parts and in the details of construction hereinafter described and claimed, it being understood that changes in the precise embodiment of the invention hereinafter disclosed can be made within the scope of what is claimed without departing from the spirit of the invention.

In the drawings wherein like numerals of reference designate corresponding parts throughout the several views:—

Figure 1 is a front view of an aeroplane provided with a landing gear constructed in accordance with the invention.

Figure 2 is an enlarged top plan view of a fender embodied in the invention.

Figure 3 is an inner side view thereof.

Figure 4 is a fragmentary view of the fender shifting mechanism.

Figure 5 is an enlarged side view of the landing wheels.

Figure 6 is a cross-sectional view on line 6—6, Figure 5.

Referring in detail to the drawings 1 denotes an aeroplane, of the monoplane type provided with a landing-gear consisting of a pair of fixed, oppositely disposed axle bars 2. Each of the latter carries a revolubly mounted landing wheel 3. Each of the axle bars 2 is braced by a fixed brace member 4, which includes a vertically extending portion 5 disposed adjacent to respective landing wheels 3.

Each of the landing wheels includes the usual heavy rubber tire 6. Both sides of the tire 6 are provided with a plurality of integrally formed, laterally disposed, propelling vanes 7, which are regularly spaced relatively to each other. The propelling vanes 7 are substantially crescent-shaped, with the concaved end 8 thereof being disposed rearwardly with respect to the direction of rotation of the landing wheels 3 in travelling forwardly, as indicated by the arrow in Figure 5.

The working or concaved ends 8 of the propelling vanes 7 extend laterally at right angles, relatively to the circumferential disposition of the sides of the associated tire 6. The thicknesses of the vanes 7 gradually decrease from their working or concaved ends 8 to their convexed ends 9 which latter are completely merged in the sides of the associated tube 6.

The construction and disposition of the propelling vanes 7 are such that the air will impinge against the working or concaved ends 8 thereof and cause the rapid rotation of the landing wheels 3 in the direction to carry the aeroplane forwardly while landing.

The purpose of rotating the landing wheels 3, in the manner stated, is to assimilate or absorb the first shock or impact as the aeroplane strikes the earth on alighting. The tendency of the rapidly rotating wheels 3 is to carry the aeroplane forwardly, consequently lessening the contacting impact and absorbing the shock invariably attending the first contact with the earth on landing. Owing to the surface inequalities of landing fields, the first shock on alighting is usually very great and anticipated with apprehension. However, by rotating the landing wheels 3 to supply a momentary forward impetus to the aeroplane, at the moment of contacting with the earth, the shock is reduced to a minimum and further the liability of upturning or tilting the aeroplane is entirely eliminated.

As the rotation of the landing wheels 3 is required and desired only while alighting, a fender 10 is provided for covering each of the landing wheels 3 so that the air cannot impinge against the latter to rotate same except when the fender 10 is removed therefrom.

The fenders 10 are shiftably supported by respective brace members 4. The inner side wall of each of the fenders 10 carries a fixed, vertically disposed tubular guide 11, which is mounted for vertical slidable movement on respective vertical portions 5, of the brace 4. The brace portions 5 and the tubular guides 11 are correspondingly rectangular in transverse cross section whereby the fenders 10 are maintained in proper alignment for vertical adjustment over respective landing wheels 3.

The fenders 10 are shifted to their elevated and lowered positions by two pairs of cables, respectively indicated at 12 and 13. The pair of cables 12 connect with the upper end of the tubular guides 11 as at 14, and the pair of cables 13 connect with the lower ends of the latter, as at 15. The two pair of cables 12 and 13 pass through a system of sheaves 16 whereby the fenders 10 may be shifted vertically on their connections with the brace portions 5.

A cable 17 is mounted on a drum 18 which is provided with an operating wheel 19 and suitably journaled for rotation in the aeroplane within convenient reach of the aviator. The cable 17 is wound several turns around the drum 18 and one end portion thereof passes forwardly from the top side of the drum 18 and is joined with the pair of cables 12. The other end portion of the cable 17 passes forwardly from the under side of the drum 18 and is joined with the other pair of cables 13. The arrangement and connection of the cables 17 with the pairs of cables 12 and 13 and with the drum 18, is such that the rotation of the drum 18 in one direction will elevate the fenders 10 to their uncovering positions, as shown in Figure 1, while the rotation of the drum 18 in the other direction will lower the fenders 10 to their covering positions as shown in dash lines in Figure 1. The inner side walls of the fenders 10 are provided with cut-out portions 20 to provide clearance for the passage of the axle bars 2 during the elevating or lowering operations. The vertical movement of the fenders 10 is, of course, limited to the length of respective associated brace portions 5.

The fenders 10 are streamlined to diminish their drag-resistance to a minimum. During the flight of the aeroplane the fenders 10 are always lowered to cover the landing wheels 3 so that the latter will not rotate by the impingement of the air thereagainst.

It is only while taking off and landing that the fenders 10 are elevated to expose the landing wheels 3 to rotate the latter by the action of the air against the propelling vanes 7 for the purpose set forth. The speed of the wheels 3 normally depends upon the speed at which the aeroplane is traveling while attempting to alight, but their speed may be controlled to some extent by aviator by elevating the fenders 10 only partially to expose only a portion of the lower ends of the landing wheels 3.

It will be obvious that the propelling vanes may be carried by and attached to other portions of the wheels 3 other than the tires 6, but as the latter are molded it is very economical and efficiently feasible to mold the vanes 7 directly to the sides of the tires 6, as illustrated and described. Further, if desired, vanes 7 may be molded to one side of the tire only instead of both sides thereof as described, but it is evident that such structure would necessitate proportionately larger vanes to meet propelling requirements.

The present invention provides a most efficient device, adaptable to any type of aeroplane, for facilitating the landing of the latter without shock, impact, and hazard now ordinarily attending alighting of aeroplanes on land.

What I claim is:

1. In an aeroplane landing-gear including landing wheels provided with rubber tires, means formed integral with said tires for rotating said landing wheels in a direction to carry the aeroplane forwardly at its first impact on alighting.

2. In an aeroplane landing-gear including landing wheels, the combination of means carried by said landing wheels and adapted for the impingement of air thereagainst during the flight of the aeroplane for rotating said landing wheels in a direction to carry the aeroplane forwardly at its first impact on alighting, and means operable for covering or for partially exposing said landing wheels for controlling the rotation of the latter.

3. In an aeroplane landing-gear including landing wheels provided with rubber tires, means formed integral with the side walls of said tires and adapted for the impingement of air thereagainst during the flight of the aeroplane for rotating said landing wheels in a direction to carry the aeroplane forwardly at its first impact on alighting.

4. In an aeroplane landing-gear including landing wheels, the combination of means carried by said landing wheels and adapted for the impingement of the air thereagainst during the flight of the aeroplane for rotating said landing wheels in a direction to carry the aeroplane forwardly at its first impact on alighting, a pair of fenders, and means operable for shifting said fenders to enclose or to partially expose said landing wheels.

5. In an aeroplane landing-gear including landing wheels provided with rubber tires, the combination of vanes formed integral with the side walls of said tires for the impingement of the air thereagainst during the flight of the aeroplane for rotating said landing wheels in a direction to carry the aeroplane forwardly at its first impact on alighting, a pair of fenders shiftably mounted in the landing gear, and means operable for simultaneously shifting said fenders to enclose or to partially expose said landing wheels.

6. An aeroplane tire having a series of projections disposed on at least one side wall of the tire and shaped to rotate the tire in a direction opposed to the direction of flight at a point below the center of the hub of the tire wheel.

7. An aeroplane tire having a series of vanes projecting from at least one side wall of the tire, said vanes having cupped and hollow portions, the cupped portions opening toward the direction of travel of the plane at a point below the center of the hub of the tire wheel.

In testimony whereof I affix my signature.

CHARLES B. SCHUMACHER.